May 27, 1941.   F. CANDIOTO   2,243,498
BAIT PAIL
Filed May 21, 1940   2 Sheets-Sheet 2
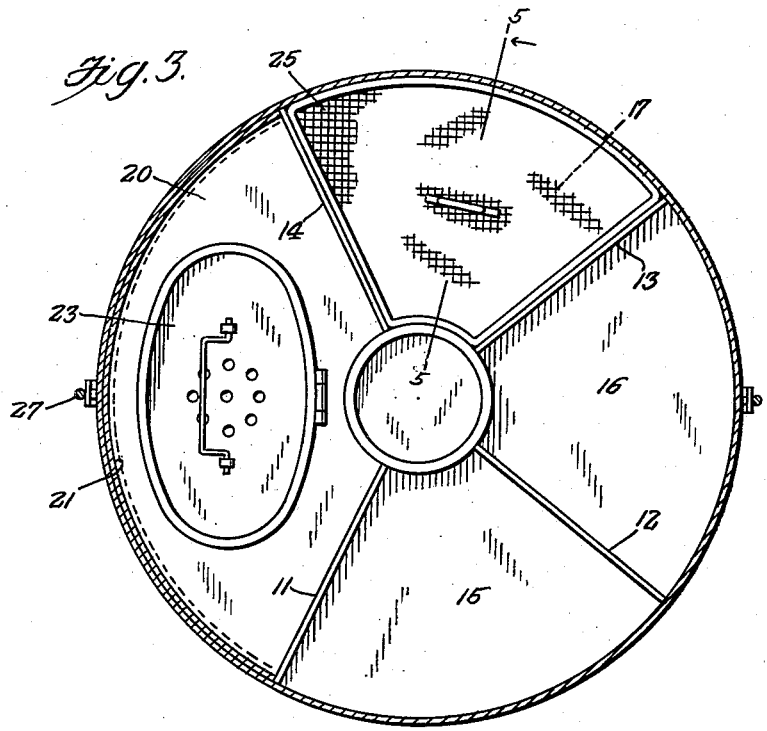
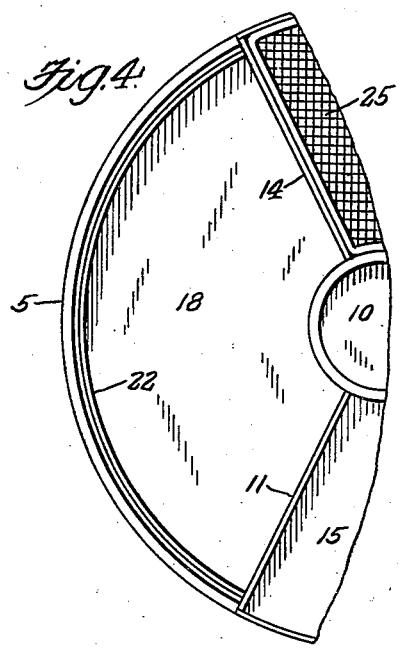
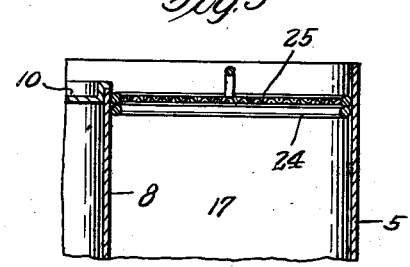
Inventor
*Frank Candioto*
By *Clarence A. O'Brien*
Attorneys Patented May 27, 1941

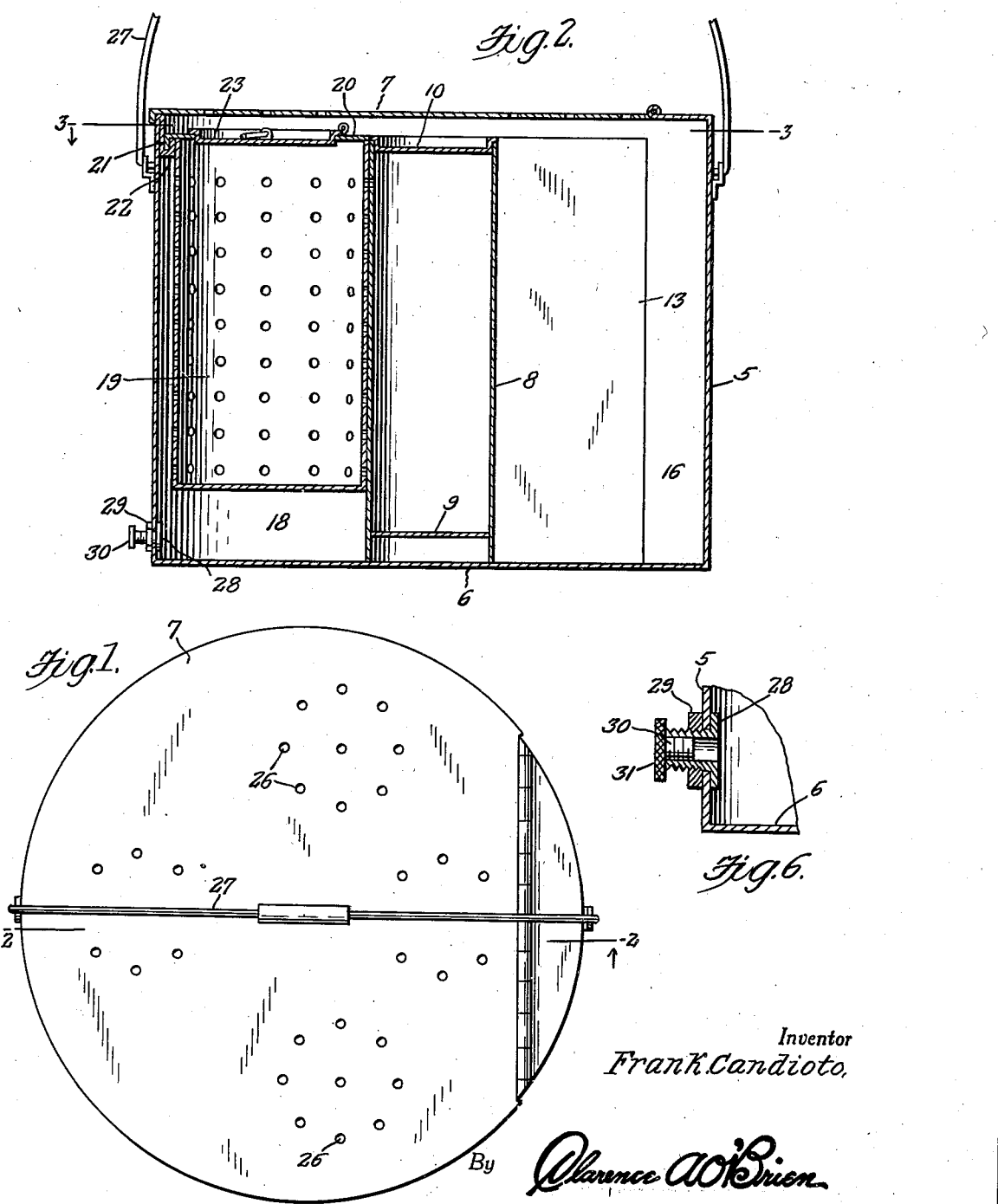

2,243,498

UNITED STATES PATENT OFFICE 2,243,498

BAIT PAIL

Frank Candioto, New Castle, Pa.

Application May 21, 1940, Serial No. 336,463

1 Claim. (Cl. 43—56)

This invention appertains to new and useful improvements in bait containers and more particularly to a bait pail in which various kinds of bait can be made readily available to the fishermen.

The principal object of the present invention is to provide a bait pail in which there are a plurality of differently constructed compartments for the purpose of holding different kinds of bait.

Another important object of the invention is to provide a bait pail constructed in such a manner as to hold an appreciable amount of ice or other temperature lowering means, to the end that the contained bait can be maintained fresh over a considerable period of time.

Other objects and advantages of the invention will become apparent to the reader of the following specification.

In the drawings:—

Figure 1 represents a top plan view of the pail.

Figure 2 is a fragmentary vertical sectional view taken substantially on the line 2—2 of Figure 1.

Figure 3 is a horizontal sectional view taken substantially on the line 3—3 of Figure 2.

Figure 4 is a fragmentary top plan view of the container showing the minnow compartment with the minnow container removed.

Figure 5 is a sectional view taken substantially on the line 5—5 of Figure 3.

Figure 6 is an enlarged fragmentary detailed sectional view through the drain plug.

Referring to the drawings wherein like numerals designate like parts, it can be seen that numeral 5 represents the pail having a bottom 6 and a hinged lid 7.

Rising from the bottom 6 is a cylindrical container 8 having a raised bottom 9 and in this container ice, carbon dioxide or some other temperature lowering medium can be placed, and this container has a lid 10.

Extending from the central container 8 are the partitions 11, 12, 13 and 14 defining the chamber 15 especially for containing crabs, the chamber 16 especially for containing worms, and the chamber 17 for containing frogs and the like, while the last chamber, namely, the chamber 18 receives the perforate container 19 for minnows or other small bait fish. This container 19 terminates when properly set in the pail above the bottom 6. One wall is of arcuate-shape transversely to snugly fit the ice container 8. A top wall 20 is provided for this minnow container 19 and one edge portion extends outwardly beyond the corresponding side wall and has a downwardly disposed flange 21 adapted to seat in an arcuate-shaped trough 22 formed by bending downwardly an upper edge portion of the pail 5 and forming the same to define a channelway. Thus the top 20 is interlapped at a portion of its perimeter with the upper edge portion of the pail 5 so that it cannot settle to the bottom of the chamber 18. A removable lid 23 is provided for the top 20 of the minnow container.

As shown in Figure 5, a wire or rod member 24 is soldered or otherwise secured in the upper portion of the chamber 17 to define a shoulder upon which the foraminous lid 25 can rest.

As can be seen in Figure 1, the pail lid 7 is formed with perforations 26 immediately over each of the compartments 15, 16, 17 and 18 so that there will be ventilation for all of these compartments.

The pail 5 is provided with a swingable bail 27.

The wall of the pail 5 at the chamber 18 is provided with drain means which consists of the flanged plug 28 disposed through an opening in the wall of the pail and this plug is threaded externally to accommodate the external nut 29. A screw plug 30 is driven into the outer end of the plug 28 to close the bore therein and this threaded plug 30 has a knurled head 31.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

In a receptacle of the character described, a container provided with a central compartment and partitions radiating therefrom defining the container into a plurality of segmental compartments, a perforated segmental-shaped container for depending disposition in one of the segmental compartments, said one segmental compartment having a trough-like structure from one side partition to the opposed partition along the upper edge portion of its outermost wall, and a downwardly disposed flange on the segmental-shaped container adapted to rest in the trough-like structure and suspend the perforated segmental container in the said segmental compartment.

FRANK CANDIOTO.